Figure 1:
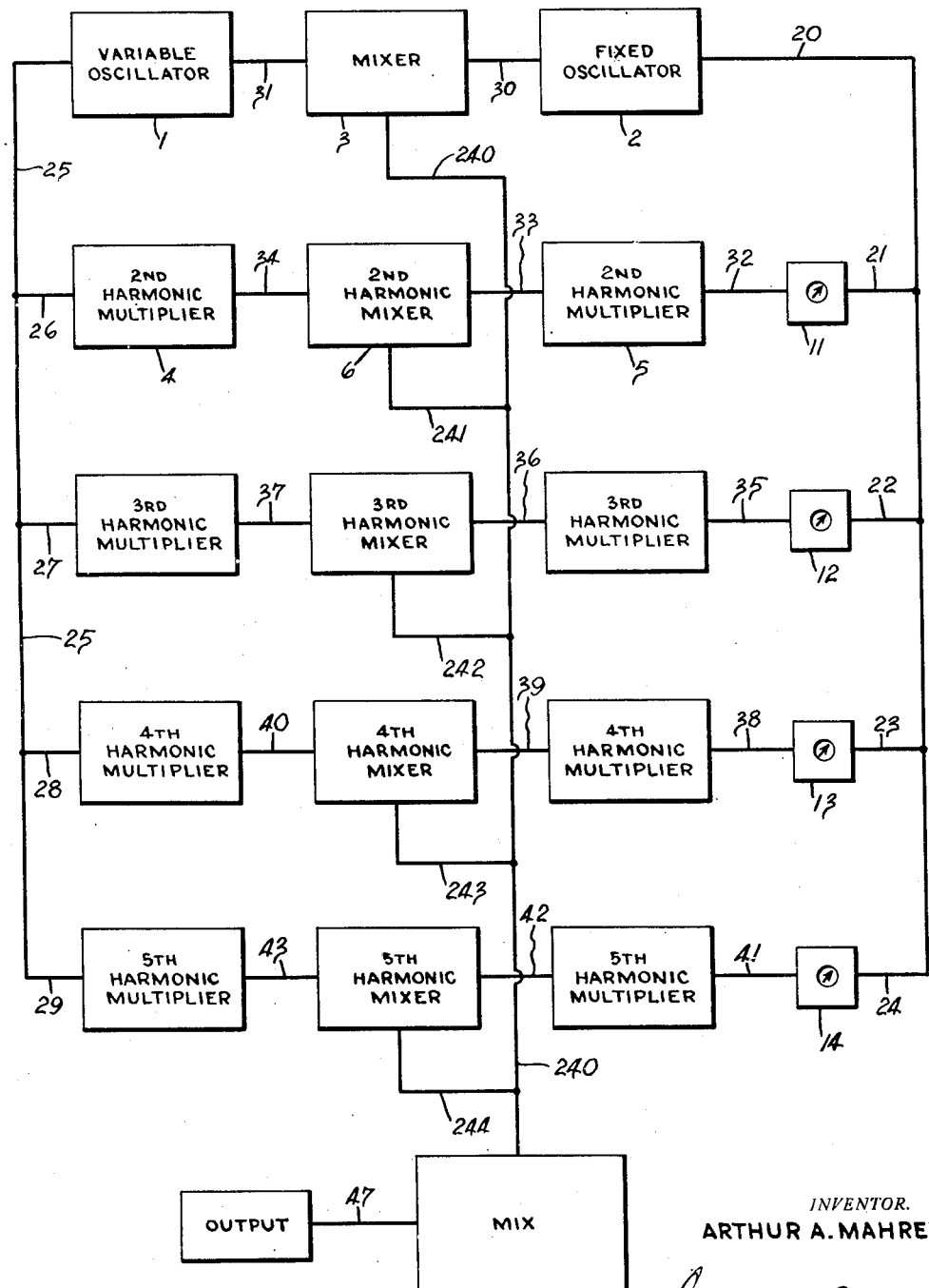

Aug. 16, 1949.                    A. A. MAHREN                    2,478,973
                              VARIABLE WAVE GENERATOR
Filed April 5, 1948                                              4 Sheets-Sheet 1

INVENTOR.
ARTHUR A. MAHREN
BY *Greene & Durr*
ATTORNEYS

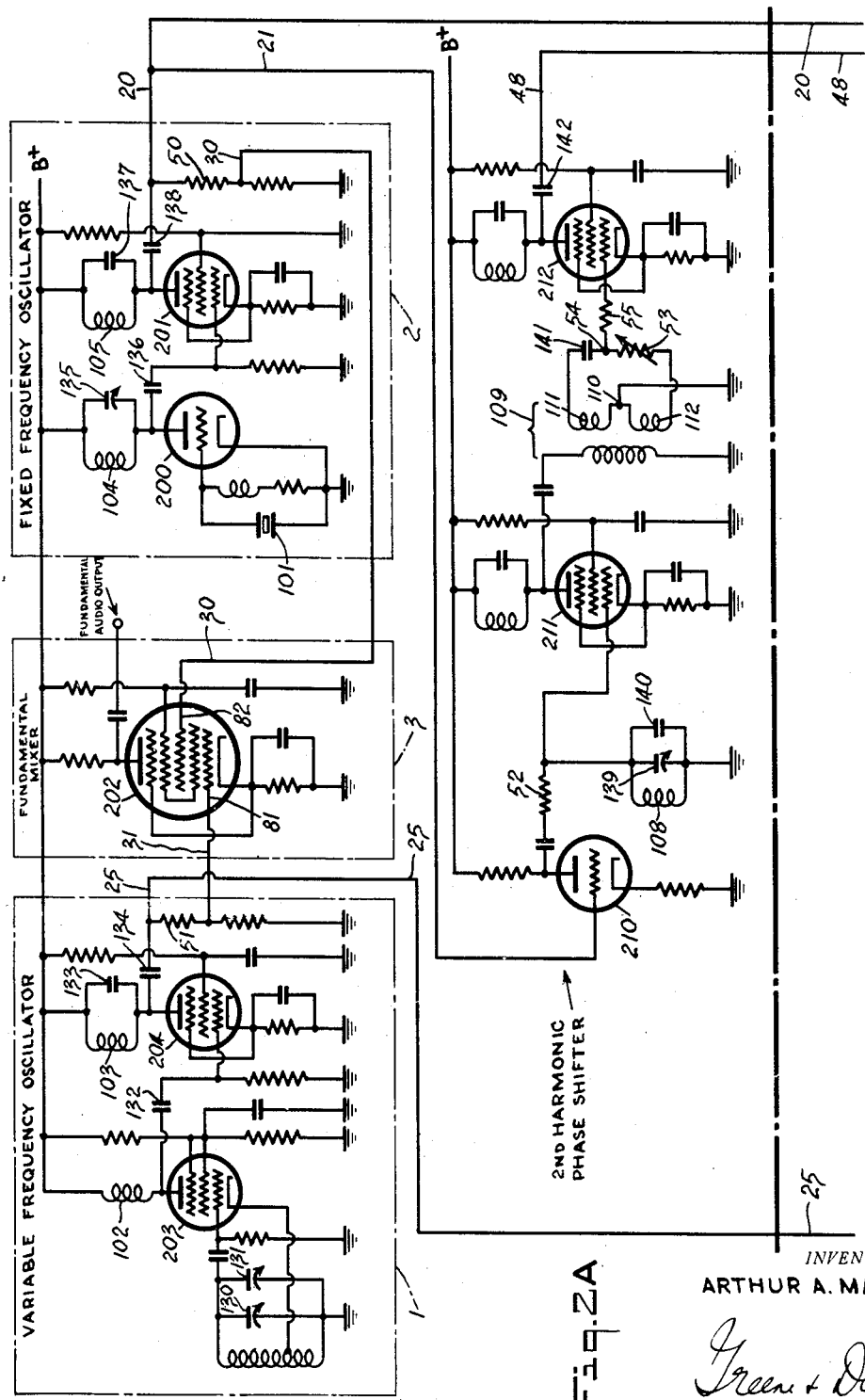

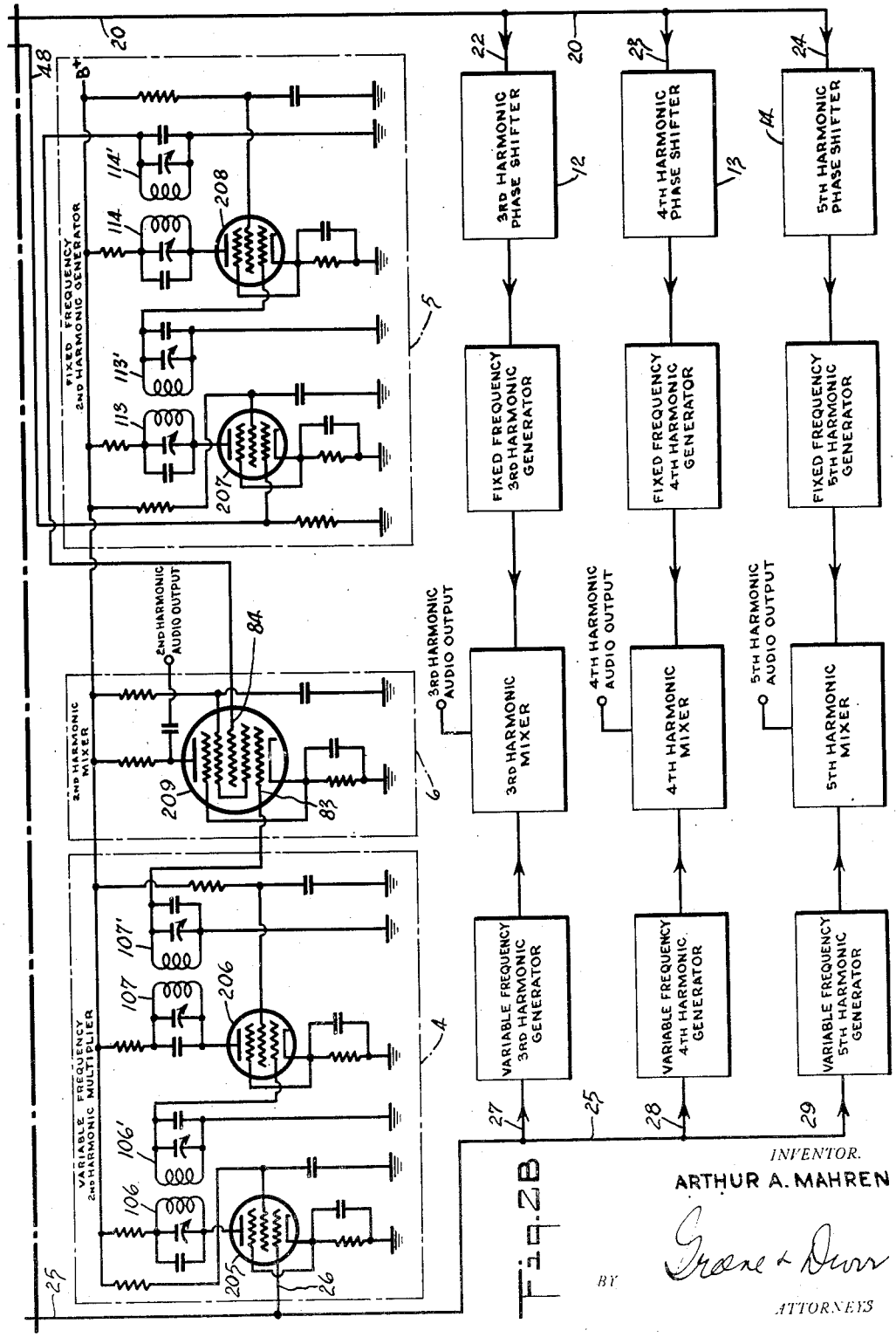

Aug. 16, 1949.  A. A. MAHREN  2,478,973
VARIABLE WAVE GENERATOR
Filed April 5, 1948  4 Sheets-Sheet 4

*INVENTOR.*
ARTHUR A. MAHREN

BY *Greene & Durr*
*ATTORNEYS*

Patented Aug. 16, 1949

2,478,973

UNITED STATES PATENT OFFICE 2,478,973

VARIABLE WAVE GENERATOR

Arthur A. Mahren, Long Island City, N. Y., assignor to Centre Research Laboratories, Inc., Briarcliff Manor, N. Y., a corporation of New York Application April 5, 1948, Serial No. 19,045

8 Claims. (Cl. 250—36)

This invention relates to a variable wave generator. More particularly it relates to an electronic apparatus adapted to reproduce, at a relatively high energy level, any given wave form.

An object of this invention is to produce a variable wave generator from a single fundamental wave generating circuit.

Another object of the invention is to produce a variable wave generator by mixing a fundamental wave with second, third and higher harmonics of the fundamental wave to produce any wave form desired.

Another object of the invention is to produce a variable wave generator by mixing a fundamental wave with the second, third, and higher harmonics of the fundamental wave in various degrees of phase relations and in any desired proportion to produce an output wave of the desired form.

Another object of the invention is to provide a variable wave generator having a large output of about a kilowatt or more.

Another object of the invention is to produce a variable wave generator that can be made to reproduce the form of any given wave and which is so constructed that the wave which is reproduced may then be analyzed as to its harmonic content and phase relationships.

Another object of the invention is to provide a variable wave generator of high power output which may be made to reproduce the wave shape of a given power supply and then to supply more power at the given wave shape than the power supply is capable of producing so that a given apparatus may be tested with a high power supply.

Another object of the invention is to provide a variable wave generator for testing audio frequency or power supply equipment (speakers, transformers, reactors, etc.) to determine their operation under distorted wave form conditions.

Another object of the invention is to provide a variable wave generator for demonstration and instruction purposes to demonstrate Fourier analysis of waves.

Another object of the invention is to provide a variable wave generator which may be connected to a piece of equipment and the waveshape changed until the equipment fails to function properly to determine under what power supply conditions the equipment will not function.

These objects and others ancillary thereto are obtained by generating a fundamental wave from a variable oscillator and a fixed oscillator and mixing this fundamental wave with the second, third and higher harmonics which are obtained by mixing the second, third and higher harmonics of the variable oscillator with the second, third and higher harmonics of the fixed oscillator in various degrees of phase relationships and strength. The second, third, fourth, fifth and higher harmonics which are taken from the variable oscillator are amplified separately to the extent desired. Likewise, the second, third and higher harmonics which are taken from the fixed oscillator are amplified to the extent desired and are also changed in phase to the extent desired. If desired, a phase changing means may also be included in the variable oscillator circuits. Also the fundamental wave (and its harmonics) may be obtained by heterodyning the output of two variable oscillators instead of the outputs of fixed oscillator and a variable oscillator. The fundamental waves and various harmonics which are obtained by mixing the waves obtained from the variable oscillator circuits with the waves obtained from the fixed oscillator circuits, are finally combined in another mixing device to give the desired output wave.

The novel features characteristic of this invention are set forth with particularity in the appended claims. The invention itself, however, both as to its organization and its method of operation, together with additional objects and advantages thereof, will best be understood from the following description of specific embodiments when read in connection with the accompanying drawings in which:

Figure 1 is a block diagram of a circuit employed.

Figure 2C:
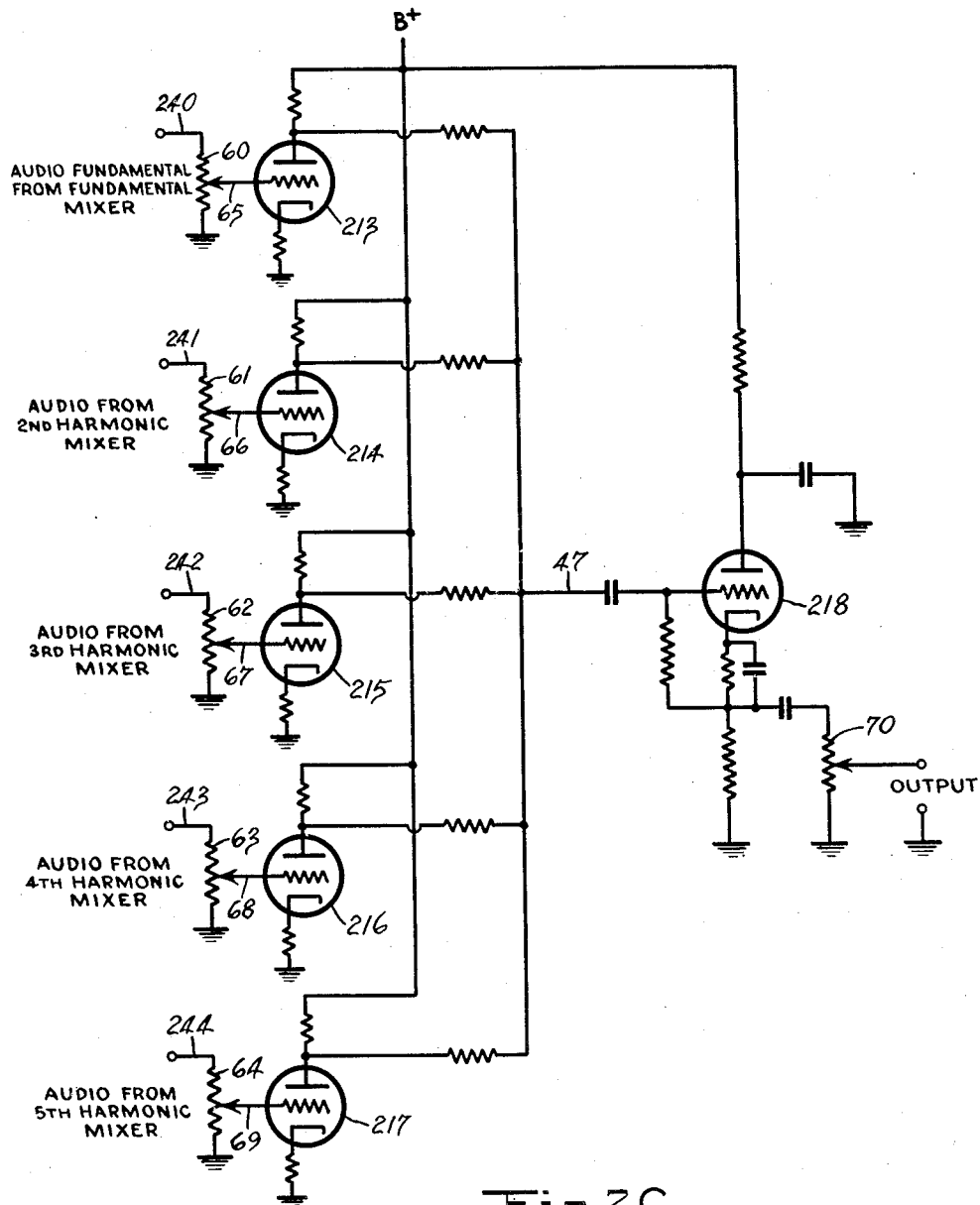

Figures 2, 2b, and 2c together represent a diagram similar to Figure 1 and with certain essential parts in the apparatus shown more in detail.

As shown in Figure 1, the fundamental output wave which is preferably of audiofrequency is obtained by mixing the outputs of two radio frequency oscillators, the said radio frequency oscillators having a difference in frequency which is the frequency desired. Preferably one of these oscillators has a fixed frequency and one has a variable frequency so that the wave obtained by mixing the outputs can be varied in frequency. However, if a single frequency is desired in the output, both of the oscillators may be fixed oscillators with a fixed difference in frequency, or if a greater range of frequencies is desired, both of the oscillators may be variable.

The output of the variable frequency oscillator, shown in box 1, either before or after amplification, is fed to a second, third, fourth, or higher harmonic multiplier where it is amplified to a desired degree. The output of the fixed frequency oscillator, shown in box 2, is also fed to a second, third and higher harmonic multiplier but is preferably passed through a variable phase shifting circuit, box 11, before passing to the harmonic generator. As many of the higher harmonic multipliers as desired may be employed, and the number employed will usually depend upon the use to which the apparatus is to be put. It has been found, however, that an apparatus with second, third, fourth, and fifth harmonic generators is sufficiently accurate to reproduce most wave forms.

Figures 2a, 2b, and 2c show a specific embodiment of the invention although all the details of the third, fourth, and fifth harmonic circuits have not been indicated. These particular multipliers are substantially the same as the multipliers shown in the second harmonic generator except for the values in tuning circuits, etc.

The way in which Figures 2a, 2b, and 2c are combined to produce the apparatus can be most easily seen by following the feed lines. The output of the fixed oscillator is fed through the line 20 which has various branching lines 21, 22, 23, and 24 leading to the second, third, fourth and fifth harmonic phase shifting circuiting respectively. The output of the variable frequency oscillator is in a similar way fed to the line 25 which has various branching lines 26, 27, 28 and 29, feeding directly to the variable frequency second, third, fourth and fifth harmonic multipliers respectively.

The output of the fixed frequency oscillator after being led through resistance 50 is also fed to the fundamental mixer by line 30 and the output of the variable frequency oscillator after being fed through the resistance 51 is also led to the fundamental mixer by line 31. Similar pairs of lines 33 and 34, 36 and 37, 39 and 40, 42 and 43, feed the outputs of the harmonic oscillators to the second, third, fourth, and fifth harmonic mixers respectively.

As shown in Figures 1 and 2c the outputs of the fundamental mixers and the harmonic mixers are fed by lines 240, 241, 242, 243 and 244 respectively to another mixing circuit and the output of this mixing circuit is fed by line 47 to the output circuit.

Variable frequency oscillator

The oscillator of box 1 is a modified Hartley type of oscillator with the rotor of the variable condensers 130, 131 at ground R. F. potential. The tube 203 of the oscillator is shown as a pentode tube with an indirectly heated cathode. A 6SJ7 tube has proved to be very satisfactory for the oscillator tube 203. The B+ voltage for tube 203 is fed through the inductive impedance 102 and the output of tube 203 is directly coupled through the coupling or blocking condenser 132 to the grid of tube 204. The tube 204 forms part of a tuned amplifier circuit which also includes the tank circuit made up of the inductance 103 and the condenser 133 and is directly coupled through condenser 134 and resistance 51 to the first grid 81 of the mixer tube 202. The output of tube 204 also is fed by means of line 25 to the 2nd, 3rd, 4th, 5th, etc. variable harmonic generator circuits. A 6SJ7 tube has also proved satisfactory as the tube 204 though it is obvious that any type of amplifier tube may be employed.

Fixed frequency oscillator

The fixed frequency oscillator circuit is shown in box 2. The fixed frequency oscillator circuit preferably comprises a crystal control although any other relatively stable oscillator circuit may be employed. In the device illustrated the oscillations of the tube 200 are controlled by the crystal 101. The circuit has a parallel resonant output impedance comprising the inductance 104 and the condenser 135 and is directly coupled though the condenser 136 to the grid of an amplifying tube 201 having the tank circuit comprising the inductance 105 and condenser 37 as the impedance in the plate circuit. The output of the tube 201 is fed to the second control grid 82 of the mixer tube 202, after passing through the blocking condenser 138 and the resistance 50. A 6J5 tube has proved satisfactory for the tube 200 and a 6SJ7 tube has proved to work satisfactorily for amplifying the output of the 6J5.

Fundamental mixer

A tube having two control grids 81 and 82 is shown in the mixer circuit of box 3. A pentagrid mixer amplifier tube such as the 6L7 has been employed in the device which is illustrated.

The output of the mixer tube is a wave having substantially the shape of a sine wave and a frequency which is the difference between the frequency of the variable frequency oscillator and the fixed frequency oscillator. An audio wave output is usually desired and it has been found to be convenient to work with a fixed frequency oscillator (box 2) having a frequency of 100,000 cycles per second and a variable frequency oscillator (box 1) having a frequency varying from 100,025 to 102,600 cycles per second thereby obtaining from the mixer tube a frequency of from 25 to 2600 cycles per second. These values given above and throughout the specifications are cited only by way of example and are not intended to limit the disclosure since it is obvious that other frequencies may be produced. The values, however, represent one advantageous and coherent group which have been obtained with the particular circuits shown and the tubes referred to in describing the various parts of the complete generator.

Variable frequency second harmonic multiplier

The variable frequency second harmonic multiplier (box 4) is connected to the fundamental frequency oscillator (box 1) by lines 25 and 26, the line 26 leading directly to the control grid of the tube 205 (box 4). The variable frequency 2nd harmonic generator shown comprises a series of two band-pass amplifier units each comprising a pentode 205 or 206 and each working into a load containing two inductively coupled tank circuits 106, 106' and 107, 107', all tuned to the same frequency. The two tubes are connected in series as shown. The output from the first pair of tank circuits 106, 106' is fed to the control grid of the second tube 206 and the output of the second pair of tank circuits 107, 107' is fed to the first control grid 83 of the mixer tube 209. All of the tank circuits 106, 106', 107, 107' are tuned to the frequency of the second harmonic and therefore discriminate against all other frequencies. If the output frequency of the fundamental mixer tube is 25–2600 cycles per second, then the frequency output of the 2nd harmonic mixer tube will be in the range of 50–5200 cycles per second.

Other variable harmonic multipliers

The third, fourth, fifth and other variable harmonic multipliers may all be substantially the same as the second harmonic generator, above described, except that the tank circuits are tuned to the particular frequency or harmonic desired. In all of these multipliers or circuits the 6SJ7 pentodes have been found to be very suitable. It is apparent that either one stage or more than two stages of amplification may be employed in any of the variable harmonic multiplier circuits.

The second harmonic phase shifter

The branch line 21 carries the output of the fixed frequency oscillator from the line 20 to the 2nd harmonic phase shifter. In this part of the device the 2nd harmonic is first isolated (and amplified, if desired) by the tube 210 and its accompanying circuit which circuit includes a tank comprising the inductance 108, the trimmer condenser 139 and the fixed condenser 140. The resistance 52 aids in suppressing undesired higher harmonics. The resulting wave, which consists largely of the second harmonic, is then fed to the grid of tube 211 which is shown as a conventionally connected pentode. The output of the tube 211 is transformer coupled to the grid of the following tube 212 in such a way as to provide a method of varying the shift in phase of the 2nd harmonic wave.

The secondary of the transformer 109 is center tapped and grounded as shown at 110 providing an inductance 111 and an inductance 112. The other side of inductance 111 is connected to the condenser 141 and the other side of inductance 112 is connected to the variable resistance 53. The opposite sides of the condenser 141 and variable resistance 53 are connected together as shown at 54 and the wave as it appears at this point is fed to the grid of the tube 212, which is another conventially connected pentode similar to tube 211. The output of the tube 212 is then led through condenser and line 48 to the fixed frequency 2nd harmonic amplifier shown in box 5 (Fig. 2B).

Since the resistance 53 can be varied at will, it will be seen that the phase shift of the output wave can be varied. In the phase shifting circuit the tube 210 may be a 6J5, and the tubes 211, 212 may be 6SJ7's. It is also apparent that the variable resistance 53 can be calibrated to give direct reading of the amount of phase shifting.

The fixed frequency 2nd harmonic multiplier

The fixed frequency wave from the phase shifting circuit is then amplified by the circuit shown in box 5. This circuit of box 5 comprises tube 207 and 208 and band pass filters including the tank circuits 113, 113', 114 and 114' which have substantially the same function as the corresponding tubes 205 and 206 and tank circuits 106, 106', 107, 107' of the variable frequency 2nd harmonic generator of box 4. The output of the fixed frequency 2nd harmonic generator is fed to the 2nd control grid 84 of the mixer tube 209 which is similar to the mixer tube 202 for the fundamental waves (see boxes 6 and 3).

Other fixed frequency harmonic phase shifters and multipliers

The 3rd, 4th, 5th, etc. harmonic phase shifters (boxes 12, 13 and 14) are substantially the same as the fixed frequency 2nd harmonic phase shifter except for the values of the tuned circuits.

Likewise, the fixed frequency 3rd, 4th and 5th harmonic multipliers are similar to the 2nd harmonic multiplier of box 5 and the mixer circuits for the 3rd, 4th and 5th harmonic is substantially the same as the mixer circuits for the fundamental and 2nd harmonic waves of boxes 3 and 6, respectively.

Final mixing circuit

The outputs of the fundamental mixer and the various harmonic mixer circuits are fed by separate lines 240, 241, 242, 243 and 244, respectively, to the master mixing circuit shown in Fig. 2C. Each of the lines 240, 241, 242, 243, and 244 leads to a volume control device 60, 61, 62, 63, 64, respectively, each of which has an adjustable tap 65, 66, 67, 68, and 69 leading to the grid of tubes 213, 214, 215, 216, 217, respectively. Tubes 213—217 are preferably matched tubes.

The combined output of tubes 213—217 is led by line 47 to the grid of the tube 218.

The output wave, which contains all the components in the desired proportions of the fundamental frequency and harmonics thereof, is taken from the volume control 70 which is located in the cathode circuit of the tube 18.

The tubes 213—218 may all be 6J5 tubes.

Although certain specific embodiments of this invention have been shown and described, it will be understood that many modifications thereof are possible. This invention, therefore, is not to be restricted except insofar as is necessitated by the prior art and by the spirit of the appended claims.

I claim:

1. A variable wave generator comprising a fixed frequency oscillator, a second oscillator having a frequency differing from the fixed frequency oscillator, means for heterodyning the output of said oscillators to obtain a wave having a frequency equal to the difference in frequencies of the two oscillators, means for generating and amplifying the second harmonic wave of the said fixed frequency oscillator, means for generating and amplifying the second harmonic output wave of said other oscillator, means for combining the said amplified second harmonic waves to obtain a resultant second harmonic wave which has a frequency which is double that of the first heterodyned wave, means for combining the heterodyned waves including the fundamental wave and its 2nd harmonic to obtain a wave having a predetermined harmonic content.

2. A variable wave generator comprising a fixed frequency oscillator, a variable frequency oscillator, means for heterodyning the output of said oscillators to obtain a wave having a frequency equal to the difference in frequencies of the two oscillators, means for multiplying and amplifying the wave of the said fixed frequency oscillator to obtain a 2nd harmonic wave, means for multiplying and amplifying the output wave of said variable frequency oscillator to obtain a second harmonic wave, means for heterodyning or combining the said second harmonic waves to obtain a resultant second harmonic wave which has a frequency which is double that of the first heterodyned wave, means for combining the heterodyned waves including the fundamental wave and its 2nd harmonic, to obtain a wave having a predetermined harmonic content.

3. A variable wave generator comprising a fixed frequency oscillator, a second oscillator having a frequency differing from the fixed frequency oscillator, means for heterodyning the output of said oscillators to obtain a wave having a frequency equal to the difference in frequencies of the two oscillators, means for shifting the phase of the 2nd harmonic component of the output of one of said oscillators, means for amplifying the second harmonic output wave of said other oscillator, means for combining the said amplified second harmonic waves to obtain a resultant second harmonic wave which has a frequency which is double that of the first heterodyned wave, means for combining the heterodyned waves including the fundamental wave and its 2nd harmonic to obtain a wave having a predetermined harmonic content.

4. A variable wave generator comprising a fixed frequency oscillator, a variable frequency oscillator, means for heterodyning the output of said oscillators to obtain a wave having a frequency equal to the difference in frequencies of the two oscillators, means for shifting the phase of the 2nd harmonic component of the output of said fixed frequency oscillator, means for amplifying the wave output of said phase shifter, means for amplifying the second harmonic output wave of said variable frequency oscillator, means for combining the said amplified second harmonic waves to obtain a resultant second harmonic wave which has a frequency which is double that of the first heterodyned wave, means for combining the heterodyned waves including the fundamental wave and its 2nd harmonic to obtain a wave having a predetermined harmonic content.

5. A variable wave generator comprising a fixed frequency oscillator, a variable frequency oscillator, means for heterodyning the output of said oscillators to obtain a wave having a frequency equal to the difference in frequencies of the two oscillators, means for shifting the phase of the output of said fixed frequency oscillator, means for multiplying and amplifying the wave output of said phase shifter to obtain a second harmonic wave, means for multiplying and amplifying the second harmonic output wave of said variable frequency oscillator, means for combining the said amplified second harmonic waves to obtain a resultant second harmonic wave which has a frequency which is double that of the first heterodyned wave, additional means for multiplying, phase-shifting, and amplifying, the output of said fixed frequency oscillator to obtain the third harmonic wave and additional means for multiplying and amplifying the output of said variable frequency oscillator to obtain the third harmonic wave thereof, means for heterodyning the corresponding amplified harmonics of the said oscillator waves, means for combining the heterodyned waves including the fundamental wave and its 2nd and 3rd harmonics to obtain a wave having a predetermined harmonic content.

6. A variable wave generator comprising a fixed frequency oscillator, a second oscillator having a frequency differing from the fixed frequency oscillator, means for heterodyning the output of said oscillators to obtain a wave having a frequency equal to the difference in frequencies of the two oscillators, means for multiplying and amplifying the wave of the said fixed frequency oscillator to obtain the 2nd harmonic thereof, means for multiplying and amplifying the second harmonic output wave of said other oscillator to obtain the 2nd harmonic thereof, means for combining the said amplified second harmonic waves to obtain a resultant second harmonic wave which has a frequency which is double that of the first heterodyned wave, additional means for multiplying and amplifying the output of said fixed frequency oscillator to obtain the 3rd harmonic thereof and additional means for multiplying and amplifying the output of said other oscillator to obtain the third harmonic thereof, means for heterodyning the corresponding amplified harmonics of the said oscillator waves, means for combining the heterodyned waves including the fundamental wave and its 2nd and 3rd harmonics to obtain a wave having a predetermined harmonic content.

7. A variable wave generator comprising a fixed frequency oscillator, a variable frequency oscillator, means for heterodyning the output of said oscillators to obtain a wave having a frequency equal to the difference in frequencies of the two oscillators, means for shifting the phase and multiplying of the output of said fixed frequency oscillator to obtain a 2nd harmonic wave, means for multiplying the wave output of said variable frequency oscillator to obtain a 2nd harmonic wave thereof, means for combining the said amplified second harmonic waves to obtain a resultant second harmonic wave which has a frequency which is double that of the first heterodyned wave, additional means for multiplying, phase-shifting, and amplifying the output of said fixed frequency oscillator to obtain the third harmonic thereof and additional means for multiplying and amplifying the output of said variable frequency oscillator to obtain the third harmonic wave thereof, further additional means for multiplying, phase-shifting, and amplifying the output of said fixed frequency oscillator to obtain the 4th harmonic thereof, further additional means for multiplying and amplifying the output of said variable frequency oscillator to obtain the 4th harmonic thereof, further additional means for multiplying, phase-shifting, and amplifying the output of said fixed frequency oscillator to obtain the 5th harmonic, further additional means for multiplying and amplifying the output of said variable frequency oscillator to obtain the 5th harmonic, separate means for heterodyning each pair of 3rd, 4th and 5th harmonic waves to obtain the 3rd, 4th, 5th harmonics of the fundamental heterodyned waves, means for combining the heterodyned waves including the fundamental wave and its 2nd, 3rd, 4th, and 5th harmonics to obtain a wave having a predetermined harmonic content.

8. A variable wave generator comprising a fixed frequency oscillator, a variable frequency oscillator, means for heterodyning the output of said oscillators to obtain a wave having a frequency equal to the difference in frequencies of the two oscillators, means for multiplying and shifting the phase of the output of said fixed frequency oscillator to obtain a 2nd harmonic wave, means for multiplying the wave output of variable frequency oscillator to obtain a 2nd harmonic thereof, means for combining or heterodyning the said second harmonic waves to obtain a resultant second harmonic wave which has a frequency which is double that of the first heterodyned wave, additional means for multiplying, phase-shifting, and amplifying the output of said fixed frequency oscillator to obtain the third harmonic, additional means for multiplying and amplifying the output of said variable frequency oscillator to obtain the third harmonic thereof, further additional means for multiplying, phase-shifting, and amplifying the output of said fixed frequency oscillator output wave to obtain the fourth harmonic, further additional means for multiplying and amplifying the output of said variable frequency oscillator to obtain the fourth harmonic, further additional means for multiplying, phase-shifting, and amplifying the output of said fixed frequency oscillator to obtain the 5th harmonic, further additional means for multiplying and amplifying the output of said variable frequency oscillator to obtain the fifth harmonic, separate means for heterodyning each pair of 3rd, 4th and 5th harmonic waves to obtain the 3rd, 4th, and 5th harmonics of the fundamental heterodyned waves, means for combining the heterodyned waves including the fundamental wave and its 2nd, 3rd, 4th and 5th harmonics to obtain a wave having a predetermined harmonic content, separate means for each of the heterodyned fundamental and its harmonics for varying the relative volume of the fundamental and harmonic waves in the combined wave.

ARTHUR A. MAHREN.

No references cited.